INVENTOR
DENNIS EDWARD EASON
BY PENDLETON, NEUMAN
SEIBOLD & WILLIAMS
ATTORNEY

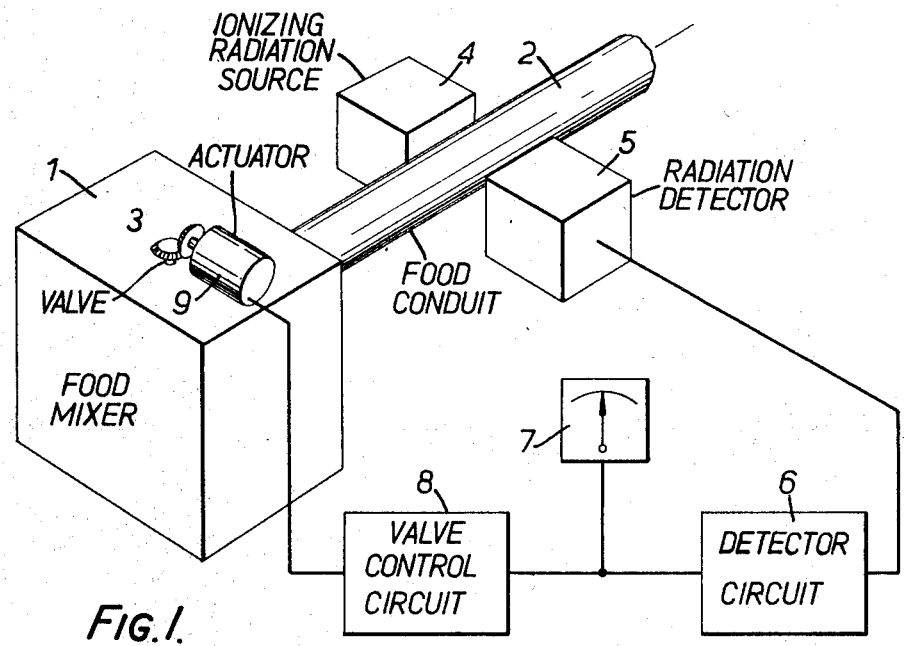
FIG. I.
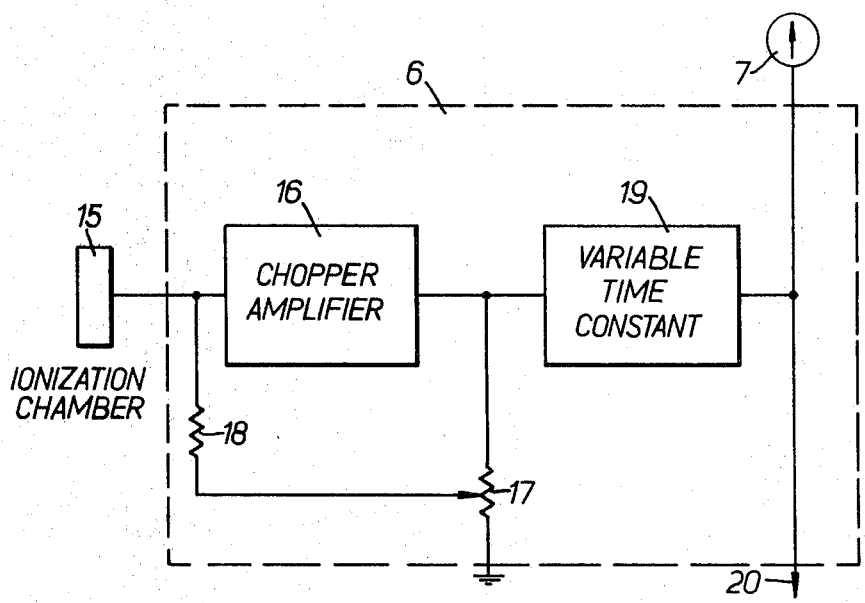
FIG. 2.

United States Patent Office 3,535,517
Patented Oct. 20, 1970

3,535,517
MIXING APPARATUS HAVING AUTOMATIC CONTROL OVER THE CONSTITUTION OF THE MIXED PRODUCT
Dennis Edward Eason, Greenford, England, assignor to J. Lyons & Company Limited
Filed Apr. 25, 1967, Ser. No. 633,636
Claims priority, application Great Britain, Apr. 26, 1966, 18,201/66
Int. Cl. G01n 23/12
U.S. Cl. 250—43.5
8 Claims

ABSTRACT OF THE DISCLOSURE

To ensure a predetermined constitution of a product prepared by mixing initial substances in a mixer, the opacity to ionizing radiation of the product leaving the mixer is measured and the result of the measurement used to control the product constitution.

---

This invention relates to improved control means for mixing apparatus and is particularly concerned with a method of and apparatus for controlling the constitution of a mixed product passing along a predetermined channel in such a manner as to provide a product having a desired constitution.

It is an object of the invention to provide a control means of improved construction for continuously operative mixing apparatus.

A more specific object of the invention is to provide control means for a mixing apparatus making use of ionizing radiation to determine the constitution of a mixed product and to control the mixing operation to produce a product of desired constitution.

Another specific object of the invention is to provide control means for an aerated food mixing apparatus making use of ionizing radiation to determine the degree of aeration of the mixed foodstuff and to control the degree of aeration to produce a desired consistency of product.

A further object of the invention is to provide automatically controlled mixing apparatus including improved means to compensate the transit time of a mixed product from a mixer to a measuring station at which the consistency of the product is measured.

Another specific object of the invention is to provide a method of preparing an aerated foodstuff batter whereby improved control of the degree of aeration may be obtained.

These and other objects and advantages of the invention will best be understood from the following description taken in conjunction with the accompanying drawings, of which:

FIG. 1 is a schematic diagram partly in perspective illustrating one embodiment of a continuous food-mixing apparatus in accordance with the invention;

FIG. 2 is a circuit diagram illustrating details of one entity of the apparatus described in relation to FIG. 1;

Figure 3:
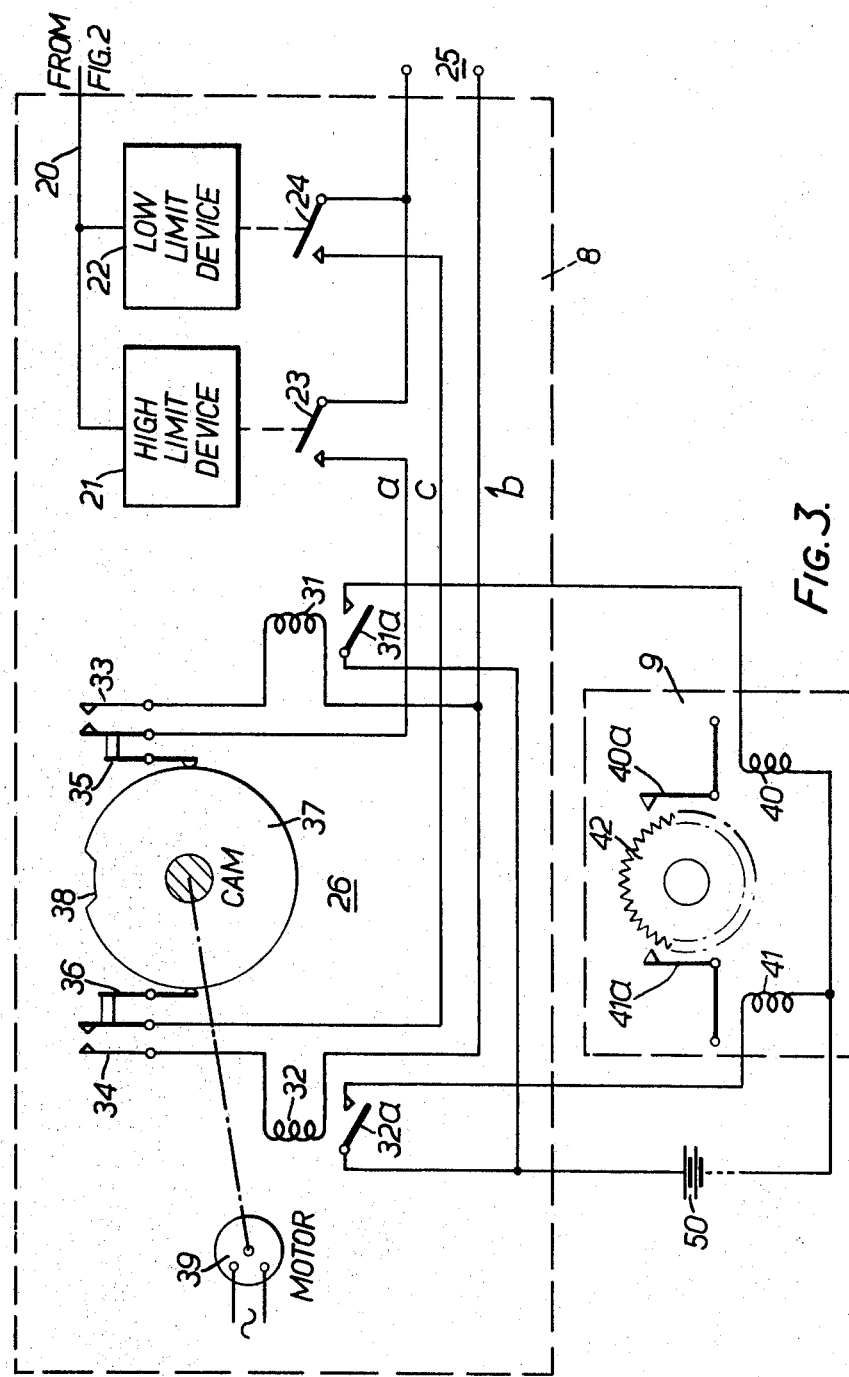
FIG. 3 is a diagram illustrating details of another entity of the apparatus described in relation to FIG. 1.

The apparatus illustrated by FIG. 1 comprises a food mixer 1 in which initially separate ingredients are mixed to provide a mixed product which is fed out by way of a suitable channel or conduit, illustrated in the present embodiment as a pipe 2, though a trough or other conveyor may be used if preferred. It is required that the food stuff leaving the mixer by way of conduit 2 shall have a predetermined consistency, expressed as weight per unit bulk or specific gravity. To produce the required product consistency, a control device, here represented only as a spindle 3 carrying a gear 3a, must be adjusted so as to vary appropriately the proportions of the ingredients contained in the mixed foodstuff produced by the mixer. For example, the mixer may include means for mixing the bulked ingredients of a batter and control device 3 may be an air control valve used to adjust the amount of aeration of the food mix leaving the mixer. Alternatively the control entity 3 may control the rate at which a solid or a liquid component of a food mix is supplied to the mixer.

To obtain a measure of the consistency of the product emerging from the mixer through conduit 2, this conduit passes between a source 4 of ionizing radiation and a radiation detector device 5 electrically responsive to ionizing radiation received from source 5 after transmission through conduit 2 and the contained food product. Thus the response of detector 5 will vary in accordance with the opacity to the ionizing radiation emitted from source 4 of the foodstuff contained in conduit 2. The radiation absorption of the mixed foodstuff for a desired consistency of the latter is initially determined empirically and circuitry 6 associated with the detector 5 is conveniently arranged and adjusted so that the pointer of a meter 7 which is fed with the output signals from circuitry 6 will assume a central position when the foodstuff in conduit 2 has a desired constitution and will be deflected from this central position to one side or the other according as the specific gravity and hence the opacity to the ionizing radiation of the food product falls below or increases above the desired value.

The output of circuitry 6 is also applied to two limit devices, contained in valve control circuits 8, which are described in more detail with reference to FIG. 3. These limit devices provide individual outputs according as the measured specific gravity of the emergent food mix falls below a predetermined lower limit or rises above a predetermined upper limit. The control outputs thus provided are applied, preferably by way of a delay device as described below in relation to FIG. 3, to an actuator 9 which controls the adjustment of a mixture control entity 3 and thus modifies the proportions of the ingredients contained in the mix in such a manner as to tend to restore the desired constitution of the mix.

FIG. 2 illustrates the circuitry included in device 6 of the apparatus described above in relation to FIG. 1, and its relation to other parts of the apparatus. This circuitry, which is conventional, may conveniently be that embodied in an apparatus known as Indicator Group TP 51 supplied by EKCO Electronics Ltd., Southend-on-Sea, Essex, England.

An ionization chamber 15 to which a necessary polarising potential is applied by conventional means (not shown) is connected to the input of a suitable electrometer amplifier 16, such as the chopper amplifier shown. The overall gain of amplifier 16 is stabilised in known manner by negative feedback derived from a potentiometer 17 shunted across its output and applied by way of a resistor 18 to the amplifier input terminal.

The output of amplifier 16 is fed by way of a conventional variable time-constant circuit 19 to an indicating meter 7 providing a display illustrative of the measured density of the foodstuff and also by way of a lead 20 to a device 8 (shown in FIG. 3) containing elements responsive to the output from amplifier 16 reaching either a "high" or a "low" limiting value within the permissible tolerance range of the process being controlled.

FIG. 3 shows a preferred embodiment of the valve control circuitry 8 and control actuation 9 of FIG. 1.

Control circuits 8 include a high limit and a low limit device of conventional type which respond to excursions of the signal received over lead 20 beyond predetermined upper and lower limits of value. Each of these devices may in known manner include, for example, a transistor biased to allow current to pass through an associated relay only when the relevant limit is exceeded.

When either limiting value is reached, the appropriate limit device 21 or 22 operates to close a received at contact 23 or 24, thus connecting an alternating current supply terminus 25 either to leads a and b or to leads b and c. These leads pass to a delay apparatus 26 which will now be described.

The connection of leads a–b or leads b–c to the alternating current source prepares an operating circuit for the respective one of alternating-current relays 31 and 32. The circuit to the relay operating coil is completed only when the appropriate one of cam-operated contacts 33, 34 closes. Contacts 33, 34 are operated by followers 35, 36 which engage a cam 37 and move to allow the controlled contacts to close only when cam notch 38 reaches them.

Cam 37 is driven by an A.C. electric motor 39 which is arranged to be operative at all times when the equipment is in use. The speed at which cam 37 is caused to turn is related to the rate at which the foodstuff in channel 2 moves between device 1 and the detection position 4, 5, the relative speeds being such that once a cam contact has closed to permit a relay to operate briefly, it will not again close until material leaving the mixing device 1 after the re-adjustment effected has reached the detection position.

When relay 31 or 32 operates in response to the signal received over lead 20 reaching a limiting value, the associated contact 31a or 32a closes to complete an operating circuit from a D.C. source 50, represented for convenience as a battery, to the appropriate one of two electromagnetic adjusting devices 40, 41 included in actuator 9. Each of devices 40, 41 comprises a ratchet member 40a, 41a which when the device is actuated engages a wheel 42 on the shaft or actuator 9 to rotate this shaft in the direction appropriate to the nature of the adjustment to be effected. Thus when control device 3 is an aerator control valve it will be turned in the direction to increase aeration when the detected density of the batter is too high and in the reverse direction when the detected density is too low.

It will be obvious that the system described above may be modified in various ways. For example, the cam delay device used to prevent repeated actuation of the control valve may be replaced by an equivalent electronic device, though the increased expense thus necessitated will seldom be justified.

The invention may be employed to control the mixing of any materials in which the presence or absence of one component has a unique effect upon the detected density.

In a specific embodiment of the invention as applied to controlling the density of an aerated cake batter the radioactive source 4 was provided by radioactive strontium. This material is advantageous in having a half-life so long that readjustment of the apparatus to take account of radio-active decay will be very seldom required.

While particular embodiments of the invention have been shown and described, it is apparent that changes and modifications may be made without departing from the invention in its broader aspects. The aim of the appended claims, therefore, is to cover all such changes and modifications as fall within the true spirit and scope of the invention.

I claim:

1. In mixing apparatus for mixing variable proportions of a plurality of initial substances to provide a mixed product fed from said apparatus through a predetermined channel, the improvement which comprises in combination: a source of ionizing radiation positioned adjacent said channel at a measuring position, radiation detector means at said position responding to radiation from said source transmitted through said product, said detector yielding an information signal representative of the constitution of said product; control means operable to vary the constitution of said product; electrically controlled actuator means coupled to operate said control means; circuit means responsive to excursions of said information signal in one and in the other sense outside a predetermined range to yield respective first and second control signals; means applying said control signals to said actuator to produce changes in the constitution of said substance tending to restore said detector output signal within said range; said last named means including means for delaying the application of said control signals to said actuator by an interval inversely proportional to the rate of flow of said mixed product through said channel.

2. The invention of claim 1 wherein said delay means comprises in combination continuously driven cam means; first and second contact means closed by said cam means at predetermined intervals; and circuit means connecting said control signals to control said actuator each by way of a responsive contact.

3. The invention of claim 2 including means for relating the speed of rotation and the form of said cam means to the speed of advance of said product in said channel so that each of said contact means is closed only once during the time taken by said product to advance from said mixer to said measuring position.

4. The invention of claim 1 wherein said actuator means comprises in combination a gear wheel; first electromagnetically actuable pawl means operable to rotate said gear in a first direction and second electromagnetically actuable pawl means operable to rotate said gear in the direction opposed to said first direction.

5. The invention of claim 4 and further including continuously driven cam means, first and second contact means closed by said cam means at predetermined intervals; first and second relay means each having an operating coil and a normally-open contact; circuit means connecting said first and second control signals to the operating coil of a respective one of said first and second relay by way of respective ones of said first and second contact means; a source of direct current; and circuit means connecting said source to actuate said first pawl means by way of the contact of said first and connecting said source to actuate said second pawl means by way of the contact of said second relay.

6. The invention of claim 1 wherein said initial substances comprise with the ingredients of an aerated foodstuff batter and wherein said control means controls the degree of aeration of said batter, whereby said apparatus produces a batter having a desired degree of aeration.

7. In automatically controlled foodstuff mixing apparatus, in combination: mixer means arranged to mix the ingredients of a batter and having valve means operable to control the degree of a foodstuff batter produced thereby; a channel conveying batter produced by said mixer at a predetermined rate of advance, a source of ionizing radiation positioned adjacent said channel at a measuring point, radiation detector means at said measuring point arranged to receive radiation from said source transmitted through a portion of said batter, said detector yielding a signal representative of the degree of aeration of said batter; electrically controlled actuator means coupled to operate said value means; circuit means responsive to excursions of an applied signal in one and in the other sense outside a predetermined range to yield respective first and second control signals; continuously driven cam means closing first and second cam contacts once only during the period of advance of said batter in said channel from said mixer to said measuring point; and circuit means applying said first and second control signals by way of said first and second contacts to control the adjustment of said valve means in one and in the other direction respectively, thereby to reduce changes in the degree of aeration of said batter.

8. The invention of claim 7 wherein said circuit means comprises, in combination: upper limit means closing a first limit contact in response to increase in said signal amplitude above a first predetermined value; lower limit means closing a second limit contact in response to decrease in said signal amplitude below a second predetermined value; an alternating current source; first and second A.C. operable relays each having an operating coil and having respective first and second normally open relay contacts; circuit means including said first limit contact and said first cam contact connecting said A.C. source to said first relay operating coil; circuit means including said second limit contact and said second cam contact connecting said A.C. source to said second relay operating coil; a direct current source; D.C. operable actuator means comprising first and second electromagnets arranged to adjust said valve in one or in the other direction in accordance with the excitation of one or the other of said electromagnets; circuit means including said first relay contact connecting and first electromagnet to said D.C. source and circuit means including said second relay contact connecting said second electromagnet to said D.C. source.

References Cited

UNITED STATES PATENTS

| | | |
|---|---|---|
| 2,750,986 | 6/1956 | Russell et al. |
| 2,884,531 | 4/1959 | Bosch. |
| 2,959,932 | 11/1960 | Spergel et al. |

ARCHIE R. BORCHELT, Primary Examiner

U.S. Cl. X.R.

250—83.3

UNITED STATES PATENT OFFICE
CERTIFICATE OF CORRECTION

Patent No. 3,535,517       Dated October 20, 1970

Inventor(s) Dennis Edward Eason

It is certified that error appears in the above-identified patent and that said Letters Patent are hereby corrected as shown below:

Column 3, line 37, "or" should be -- of --;

Column 4, line 19, "responsive" should be -- respective --;

Column 4, line 46, delete "with";

Column 4, line 62, "value" should be -- valve --;

Column 6, line 2, "and" should be -- said --.

SIGNED AND SEALED
DEC 22 1970

(SEAL)
Attest:

Edward M. Fletcher, Jr.
Attesting Officer

WILLIAM E. SCHUYLER, JR.
Commissioner of Patents